(12) United States Patent
Arrowood, Jr. et al.

(10) Patent No.: US 7,353,843 B2
(45) Date of Patent: Apr. 8, 2008

(54) SEQUENCING VALVE AND HYDRONIC SYSTEM

(75) Inventors: Ben G. Arrowood, Jr., Clover, SC (US); James H. M. Meyer, Dallas, NC (US); GangFu Zhang, Gastonia, NC (US)

(73) Assignee: Hays Fluid Controls, a division of ROMAC Industries, Inc., Dallas, NC (US)

( * ) Notice: Subject to any disclaimer, the term of this patent is extended or adjusted under 35 U.S.C. 154(b) by 436 days.

(21) Appl. No.: 11/216,448

(22) Filed: Aug. 31, 2005

(65) Prior Publication Data

US 2006/0000598 A1    Jan. 5, 2006

Related U.S. Application Data

(62) Division of application No. 10/407,152, filed on Apr. 3, 2003, now Pat. No. 6,983,764.

(51) Int. Cl.
*F16K 11/00* (2006.01)
*F24F 3/00* (2006.01)

(52) U.S. Cl. .................................... 137/595; 137/636.1
(58) Field of Classification Search ............. 137/636.1, 137/595, 606, 607
See application file for complete search history.

(56) References Cited

U.S. PATENT DOCUMENTS

| | | | |
|---|---|---|---|
| 877,063 A | 1/1908 | Edes | |
| 1,024,175 A | 4/1912 | Boye | |
| 2,011,601 A | 8/1935 | Williams | |
| 2,366,693 A | 1/1945 | Benaway | |
| 2,545,529 A | 3/1951 | Obecny | |
| 2,691,990 A | 10/1954 | Ashton et al. | |
| 3,045,697 A | 7/1962 | Seguenot | |
| 3,128,788 A | 4/1964 | Millard | |
| 3,171,437 A | 3/1965 | Seuchting, Jr. | |
| 3,334,658 A | 8/1967 | Kaatz | |
| 3,353,554 A | 11/1967 | Ludkin | |
| 3,411,538 A | 11/1968 | Gruner et al. | |
| 3,516,639 A | 6/1970 | Himmelman | |

(Continued)

FOREIGN PATENT DOCUMENTS

FR    2 831 924 A1    5/2003

OTHER PUBLICATIONS

"Cams and Cam Design," Machinery's Handbook, ISBN-0-8311-2666-3, pp. 2163-2169, vol. 26, Industrial Press Inc., New York.

*Primary Examiner*—Kevin Lee
(74) *Attorney, Agent, or Firm*—Alston & Bird LLP

(57) ABSTRACT

A sequencing valve and associated hydronic system are provided. The valve has first and second ports, which can be connected to a heat exchange device, and the valve is configured to selectively provide multiple fluids to the heat exchange device. For example, the valve can selectively connect hot and cold water supplies to the heat exchanger so that the heat exchanger can be used alternately to heat and cool air for a refrigeration system. The valve can include check valves that are adjusted by rotatable cams for controlling the flow of fluids into and out of the ports. Each cam can be mounted on a rotatable shaft so that the cams rotate to adjust the check valves between open and closed positions.

11 Claims, 9 Drawing Sheets

U.S. PATENT DOCUMENTS

| | | | |
|---|---|---|---|
| 3,770,050 A * | 11/1973 | Nakanishi | 137/595 |
| 3,774,504 A | 11/1973 | Bonney | |
| 3,784,113 A | 1/1974 | Specht | |
| 3,894,719 A | 7/1975 | Horvath et al. | |
| 3,985,149 A | 10/1976 | Tyrner et al. | |
| 4,007,757 A | 2/1977 | Emmert | |
| 4,124,038 A | 11/1978 | Bonney | |
| 4,205,821 A | 6/1980 | Cyphelly | |
| 4,219,044 A | 8/1980 | Wilson | |
| 4,248,104 A | 2/1981 | Wood, III | |
| 4,461,453 A | 7/1984 | Wilson | |
| 4,501,286 A | 2/1985 | Rohlfing et al. | |
| 4,570,674 A | 2/1986 | Kaye | |
| 4,573,497 A | 3/1986 | White | |
| 4,712,582 A | 12/1987 | Marks | |
| 4,934,408 A | 6/1990 | Christopherson | |
| 4,966,194 A | 10/1990 | Nakatsukasa et al. | |
| 5,109,887 A | 5/1992 | Saito et al. | |
| 5,411,438 A | 5/1995 | White et al. | |
| 5,540,584 A | 7/1996 | Greco | |
| 5,878,775 A | 3/1999 | Tamburro, Jr. | |
| 5,911,242 A | 6/1999 | Parker | |
| 6,352,105 B1 | 3/2002 | Serratto | |
| 6,405,995 B1 | 6/2002 | Spain | |
| 6,779,560 B1 | 8/2004 | Reis | |
| 7,165,569 B2 * | 1/2007 | Berbuer | 137/595 |

* cited by examiner

SEQUENCING VALVE AND HYDRONIC SYSTEM

CROSS REFERENCE TO RELATED APPLICATIONS

This application is a divisional of U.S. application Ser. No. 10/407,152, filed Apr. 3, 2003, now U.S. Pat. No. 6,983,764, which is hereby incorporated herein in its entirety by reference.

BACKGROUND OF THE INVENTION

1) Field of the Invention

The invention relates to a valve for controlling the flow of fluids and, more particularly, to a sequencing valve for controlling the flow of fluids from multiple fluid circuits through one or more ports, for example, to a device such as a heat exchanger.

2) Description of Related Art

Secondary refrigeration systems, sometimes referred to as hydronic systems, provide heated and chilled fluids to a terminal unit, which uses the fluids to heat or cool air. A conventional terminal unit includes two heat exchangers, one that receives the hot fluid for heating the air, and one that receives the cold fluid for cooling the air. The flow of the fluids, usually water, is controlled by thermostatically operated valves known as automatic temperature control (ATC) valves. In a heating mode of operation, a first set of valves opens to fluidly connect the first heat exchanger to a hot water supply and a return line so that the water flows from the hot water supply, through the heat exchanger where thermal energy is transferred to the air, and to the hot water return line for reheating or discharging. In a cooling mode of operation, the first set of valves closes the connections between the first heat exchanger and the hot water supply and return lines. A second set of valves opens to fluidly connect the second heat exchanger to a cold water supply and a return line. The cold water then flows from the cold water supply, through the second heat exchanger where thermal energy is absorbed by the water from the air, and to the cold water return line for re-cooling or discharging. Thus, the terminal unit of the conventional system includes separate fluid circuits for heating and cooling, each circuit having its own heat exchanger and control valves. In addition, each fluid circuit can separately be provided with devices for monitoring and regulating the fluid flow. The duplication of the components in the separate fluid circuits increases the initial cost of the refrigeration system as well as the size and complexity of the system.

Thus, there exists a need for a hydronic system and sequencing valve that reduce the number of duplicate components required for the separate heating and cooling fluid circuits described above. The system should be capable of operating in multiple modes to selectively heat or cool the air in the terminal unit.

BRIEF SUMMARY OF THE INVENTION

The present invention provides a hydronic system and an associated sequencing valve. The valve is capable of selectively providing multiple fluids to a terminal unit that uses a single heat exchange device. For example, the valve can selectively connect hot and cold fluid supplies to a heat exchanger so that the heat exchanger can be used alternately to heat and cool air for a secondary refrigeration system. Thus, the size and complexity of the terminal unit can be reduced.

According to one aspect of the present invention, there is provided a hydronic system for selectively exchanging thermal energy between multiple fluids and a thermal medium such as air. The system includes a heat exchanger with first and second ports for receiving fluids from first and second fluid sources and discharging the fluids to first and second fluid exhausts. A sequencing valve is adjustable between a first operable position, in which the valve fluidly connects the first fluid source and the first fluid exhaust to the heat exchanger, and a second operable position, in which the valve fluidly connects the second fluid source and the second fluid exhaust to the heat exchanger. The first fluid source can supply a first fluid that is hotter than the thermal medium and a second fluid that is cooler than the thermal medium to selectively heat and cool the thermal medium. According to one embodiment, the sequencing valve fluidly connects the first fluid source to the first port and fluidly connects the second fluid source to the second port so that the valve in the first operable position provides a flow of the first fluid through the heat exchanger and the valve in the second operable position provides a flow of the second fluid in an opposite direction through the heat exchanger.

According to another aspect of the present invention, the sequencing valve has a housing that defines first and second ports. Four check valves are fluidly connected to the housing so that the first and second check valves can be adjusted to control a flow of fluid through the first port, and the third and fourth check valves can be adjusted to control a flow of fluid through the second port. First and second cams are mounted on a rotatable shaft in the housing. When the shaft is rotated to a first operable position, the first cam adjusts one of the first and second check valves to fluidly connect that valve with the first port. Similarly, the second cam adjusts one of the third and fourth check valves to fluidly connect that valve to the second port. However, when the shaft is rotated to a second operable position, the first cam fluidly connects the other of the first and second valves with the first port, and the second cam fluidly connects the other of the third and fourth check valves to the second port.

Each of the check valves can be a ball check valve that has a ball biased against a valve seat, and the cams can be arranged to operably contact the balls to adjust the check valves. Each cam can define a generally circumferential groove that receives the balls of the check valves, and each groove can have a cross-sectional shape that defines an arc of smaller radius than the balls so that the cams engage and grip the balls. For example, each cam can also be cylindrical and the groove can vary in depth, extending in an eccentric arc to define a cam profile. Further, the first and second cams can be staged to engage respective check valves at different rotational positions of the shaft. The shaft can be adjustable to an off position, in which the cams are configured so that the check valves are closed.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE INVENTION

The present invention now will be described more fully hereinafter with reference to the accompanying drawings, in which some, but not all embodiments of the invention are shown. Indeed, this invention may be embodied in many different forms and should not be construed as limited to the embodiments set forth herein; rather, these embodiments are provided so that this disclosure will satisfy applicable legal requirements. Like numbers refer to like elements throughout.

Figure 1:
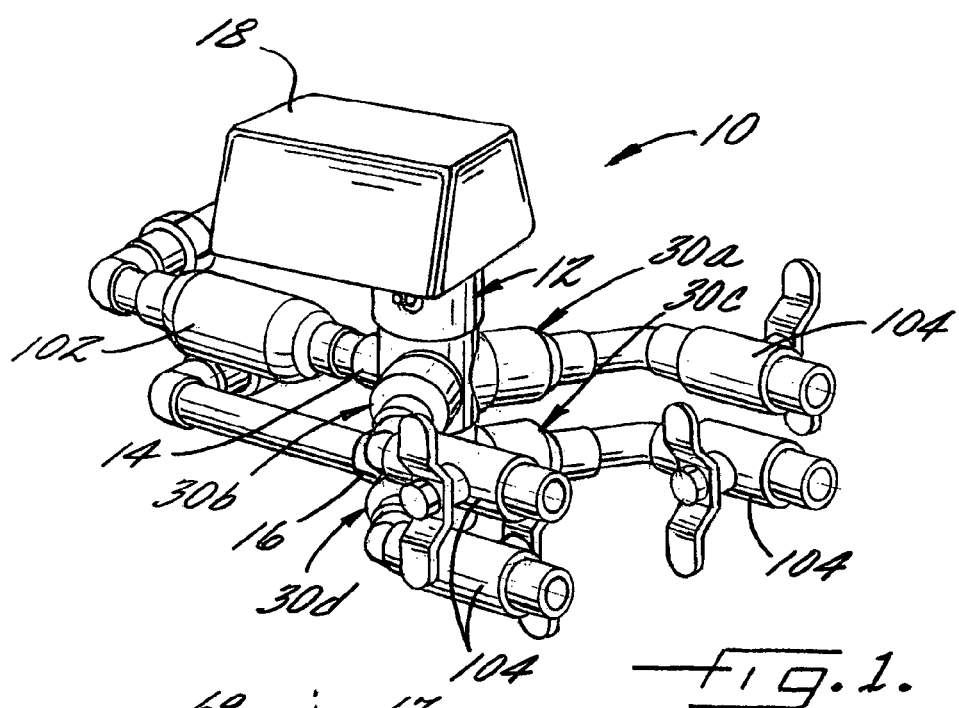
FIG. 1 is a perspective view illustrating a sequencing valve according to one embodiment of the present invention.
Figure 2A:
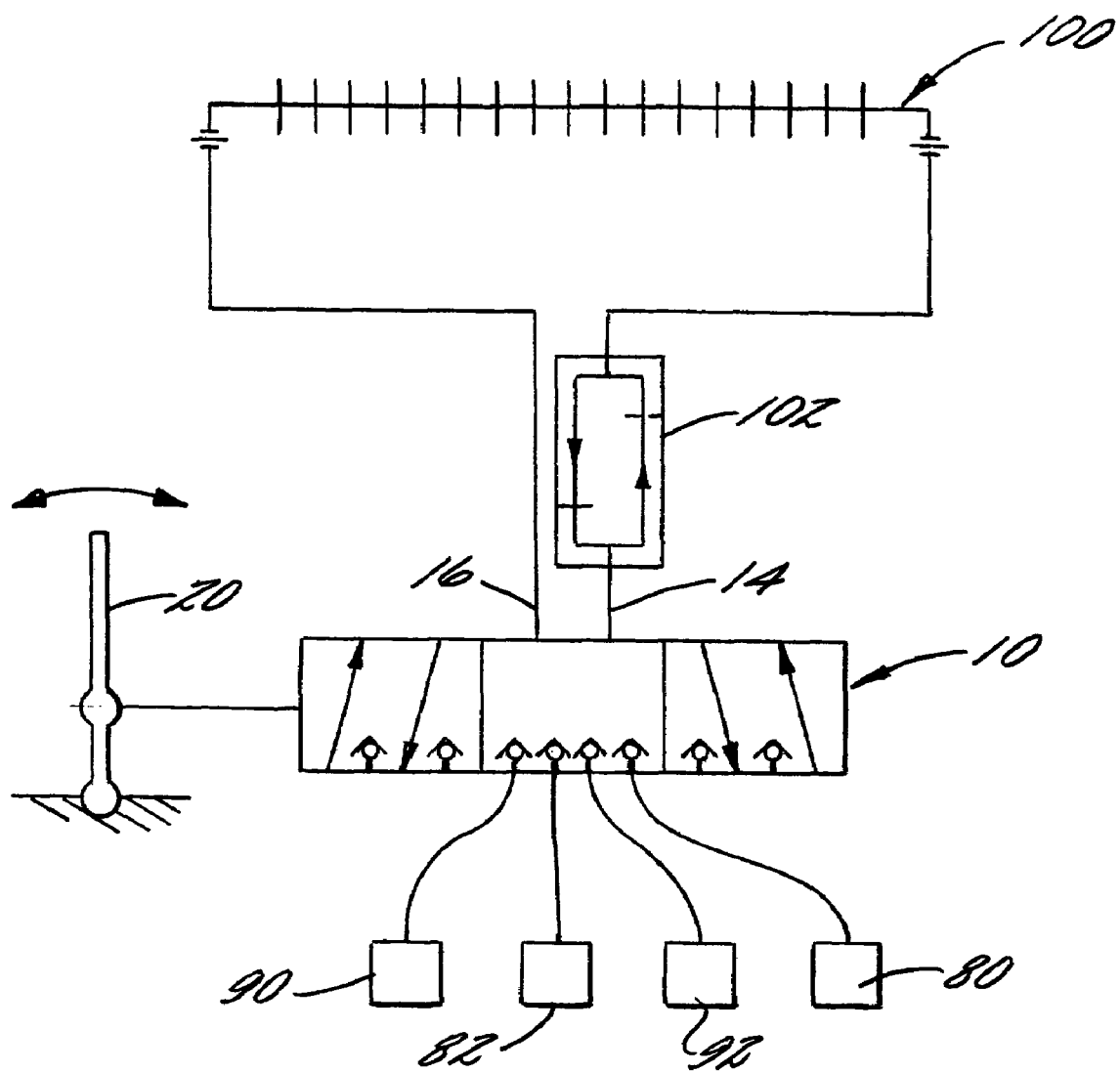
FIG. 2A is a schematic view illustrating a hydronic system with the sequencing valve of FIG. 1, shown in the off position.
Figure 2B:
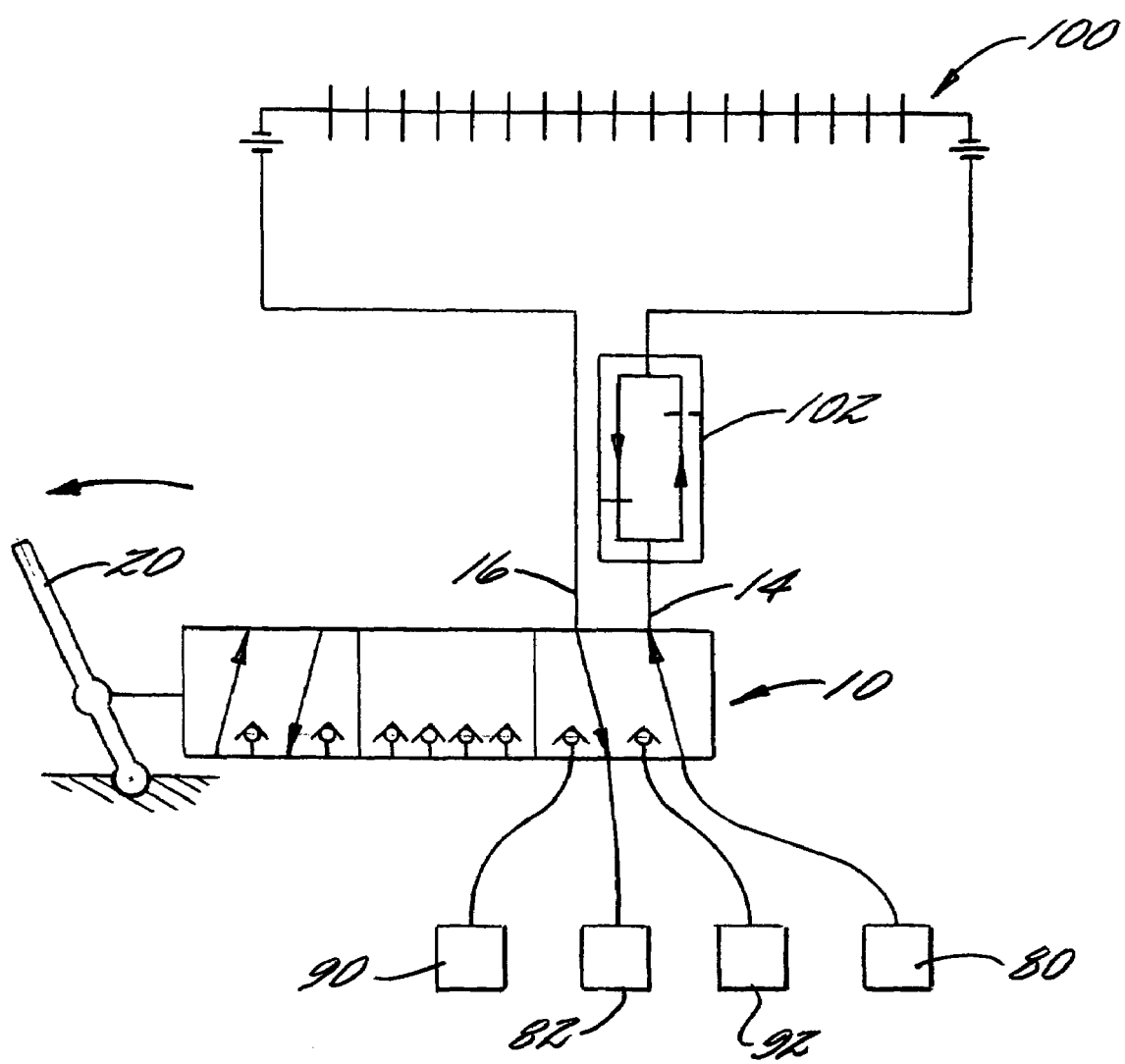
FIG. 2B is a schematic view illustrating the hydronic system of FIG. 2A, shown in a first operable position.
Figure 2C:
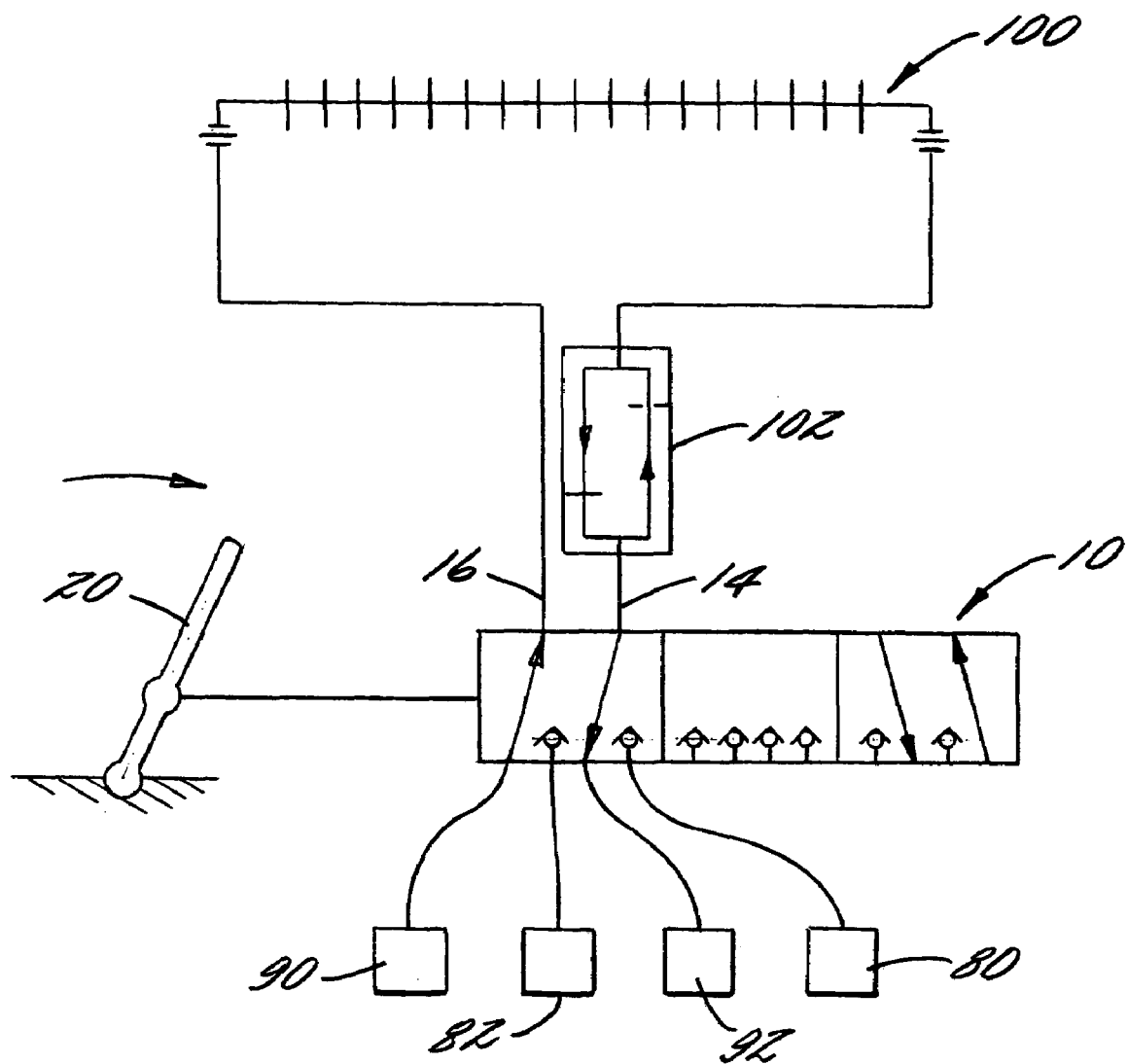
FIG. 2C is a schematic view illustrating the hydronic system of FIG. 2A, shown in a second operable position.

Referring to FIG. 1, there is shown a sequencing valve 10 according to one embodiment of the present invention. The sequencing valve 10 has a housing 12 that defines two ports 14, 16 for input and/or output. The ports 14, 16 can correspond to ports of a heat exchanger in a terminal unit of a hydronic system such that fluids can be circulated through the heat exchanger. The heat exchanger and, hence, the terminal unit can be used to transfer thermal energy between the circulating fluids and a thermal medium in the terminal unit to heat or cool the thermal medium. As schematically illustrated in FIGS. 2A-2C, the sequencing valve 10 selectively connects the ports 14, 16, and hence a heat exchanger 100, to first and second fluid supplies 80, 90, for example, so that the single heat exchanger 100 can be used for alternately circulating one of multiple fluids to heat or cool the thermal medium in the terminal unit. The valve 10 can be adjusted between an off position and first and second operable positions. The circulating fluids can be water, and the thermal medium can be a fluid such as air. In the illustrated embodiment, the first and second fluid sources 80, 90 are sources of hot and cold water and the first and second operable positions are for heating and cooling air in the terminal unit, respectively. In other embodiments, other fluids at other temperatures can be used, and the heat exchanger 100 can be used to heat liquids or other thermal media. Manual isolation valves 104 can also be provided to selectively control flow into and out of the sequencing valve 10, for example, to turn off flow at the valve 10 during valve maintenance or replacement.

The heat exchanger 100 or the sequencing valve 10 can also include flow monitoring devices for measuring the temperature of the fluid, the rate of flow, or other characteristics of the fluid or the flow. Additional control devices can be also provided in fluid communication with the heat exchanger 100 and valve 10, for example, ATC valves or a constant flow control device 102 such as a constant flow valve. The constant flow control device 102 can maintain a desired flow rate, and can be operable for fluid flowing in both directions. Thus, as shown in FIG. 2A, the constant flow control device 102 can be disposed between one of the ports 14, 16 and the heat exchanger 100 and configured to maintain a desired flow regardless of the direction in which the fluid is flowing through the heat exchanger 100.

In the off position of the sequencing valve 10 (FIG. 2A), neither of the sources 80, 90 is connected to the ports 14, 16, and there is no flow through the heat exchanger 100 from either of the sources 80, 90. The valve 10 can be adjusted manually or by a hydraulic, pneumatic, or electric actuator such as a motor. If an actuator 18 is used, the actuator 18 can be controlled automatically, for example, by a processor or a monitoring device that detects the temperature of the fluids and/or the thermal medium in the exchanger 100 and adjusts the valve 10, for example, depending on the difference in temperature between the fluid circulated through the valve 10 and the air in the heat exchanger 100 and according to the desired energy transfer between the fluid and the air. Alternatively, an operator can control the actuator 18, for example, by adjusting a control handle 20 as shown in FIGS. 2A-2C. When the handle 20 is rotated counterclockwise, the valve 10 is adjusted from the off position to the first operable position (FIG. 2B), thereby fluidly connecting the first fluid source 80 to the first port 14 and fluidly connecting a first fluid exhaust 82 to the second port 16. Fluid flows from first fluid source 80, through the sequencing valve 10, through the first port 14, through the heat exchanger 100, and returns through the second port 16 to the valve 10 and then to the first fluid exhaust 82. In the heat exchanger 100, thermal energy is exchanged between the first fluid and the air. In this case, the first fluid is hotter than the air so the first fluid heats the air and the temperature of the first fluid is reduced. The first fluid exhaust 82 can be a reheater or other processing device, and the first fluid exhaust 82 can form part of the first fluid source 80.

When the handle 20 is rotated clockwise, the sequencing valve 10 is adjusted to the second operable position (FIG. 2C), thereby fluidly connecting the second fluid source 90 to the second port 16 and fluidly connecting a second fluid exhaust 92 to the first port 14. Fluid flows from the second fluid source 90, through the valve 10, through the second port 16, through the heat exchanger 100, and returns through the first port 14 to the valve 10 and then to the second fluid exhaust 16. Thermal energy is exchanged between the second fluid and the air. In this case, the second fluid is cooler than the air in the heat exchanger 100, so the second fluid cools the air and the temperature of the second fluid is increased. The second fluid exhaust 92 can be a re-cooler or other processing device, which can be integral to the second fluid source 90, so that the second fluid can be re-used. Thus, the term "exhaust" refers to an outlet through which the fluids can be discharged, and the exhausts 82, 92 can include various types of outlet devices. In the illustrated embodiment, the first and second fluids flow in opposite directions through the valve 10 and the heat exchanger 100, but the fluids can flow in the same direction in other embodiments of the present invention, for example, so that each of the fluids enters the valve 10 through the first port 14 and exits the valve 10 through the second port 16.

Figure 3:
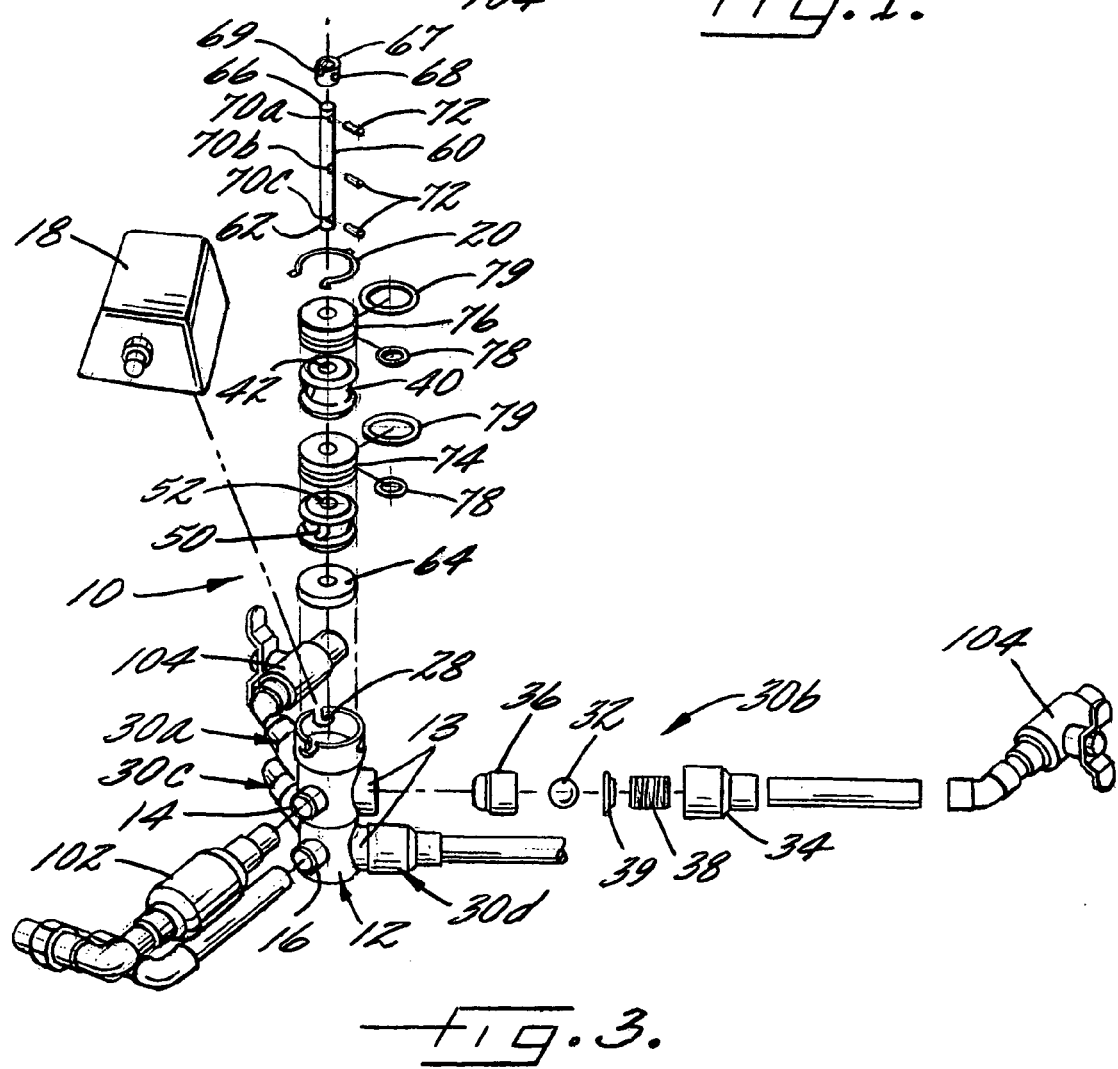
FIG. 3 is an exploded assembly view illustrating the sequencing valve of FIG. 1.
Figure 4:
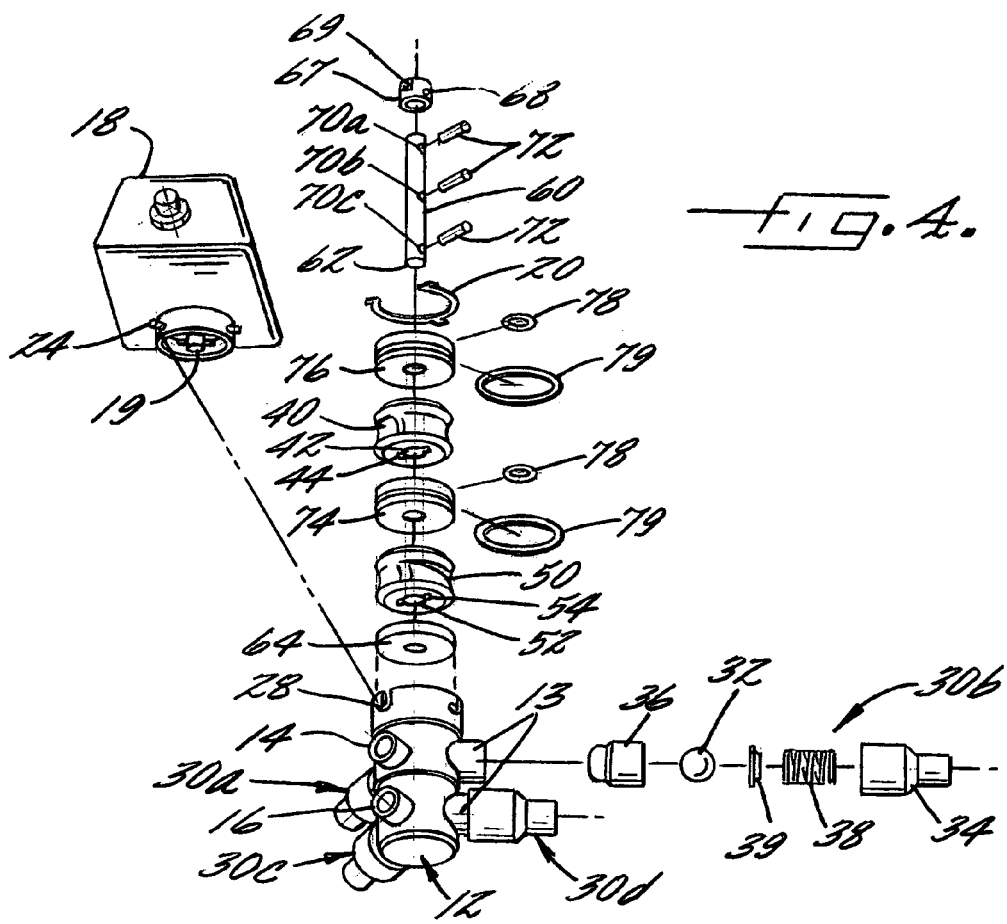
FIG. 4 is another exploded assembly view illustrating the sequencing valve of FIG. 1.

For purposes of illustrative clarity, exploded assembly views of the valve 10 of FIG. 1 are illustrated in FIGS. 3 and 4. Each of the fluid sources 80, 90 and exhausts 82, 92 is connected to the housing 12 of the sequencing valve 10 through a ball check valve 30*a*, 30*b*, 30*c*, 30*d*. The ball check valves 30*a*, 30*b*, 30*c*, 30*d* can be brazed or otherwise connected to openings 13 in the housing 12, and the fluid sources 80, 90 and exhausts 82, 92 can be connected to the check valves 30*a*, 30*b*, 30*c*, 30*d* by conventional connections such as sweat fittings formed between the tube-like check valve 30*a*, 30*b*, 30*c*, 30*d* and pipes that extend to the sources or exhausts 80, 90, 82, 92. One of the ball check valves 30*b* is shown in an exploded view in FIGS. 3 and 4 for visual clarity; each of the other check valves 30*a*, 30*c*, 30*d* can be formed similarly. Each ball check valve 30*a*, 30*b*, 30*c*, 30*d* can be formed of a ball 32 in a ball check valve housing 34 that is biased against a valve seat 36 by a coil spring 38 and a spring guide 39. The balls 32 are urged by the springs 38 toward the housing 12 of the sequencing valve 10 so that a portion of each ball 32 extends through an aperture in the seat 36 and into the housing 12, as illustrated in FIG. 6.

First and second cams 40, 50 are mounted in the housing 12 on a rotatable shaft 60 that extends longitudinally therethrough. The shaft 60 is supported at one end 62 by bearings in an end bearing housing 64 and extends through bores 42, 52 in the cams 40, 50 to an opposite end 66 at the same side of the housing 12 as the actuator 18. The end 66 of the shaft 60 is pinned to a drive coupling 67, which engages the actuator 18 so that the shaft 60 and, hence, the cams 40, 50 can be rotated by the actuator 18. Holes 70*a*, 70*b*, 70*c* through the shaft 60 can be provided for receiving pins 72 that connect the drive coupling 67 and the cams 40, 50 thereto. The cams 40, 50 can also define slots 44, 54 or recesses that receive the pins, 72 to prevent the cams 40, 50 from rotating relative to the shaft 60 and to limit axial movement between the cams 40, 50 and the shaft 60. A central housing 74 is disposed between the cams 40, 50, and a drive side housing 76 is disposed between the first cam 40 and the drive coupling 67. Each of the central and drive side housings 74, 76 can be provided with a shaft seal 78 and an outside seal 79. The shaft seals 78 fluidly seal the housings 74, 76 to the shaft 60, and the outside seals 79 fluidly seal the central and drive side housings 74, 76 with the inner surface of the housing 12.

Figure 5:
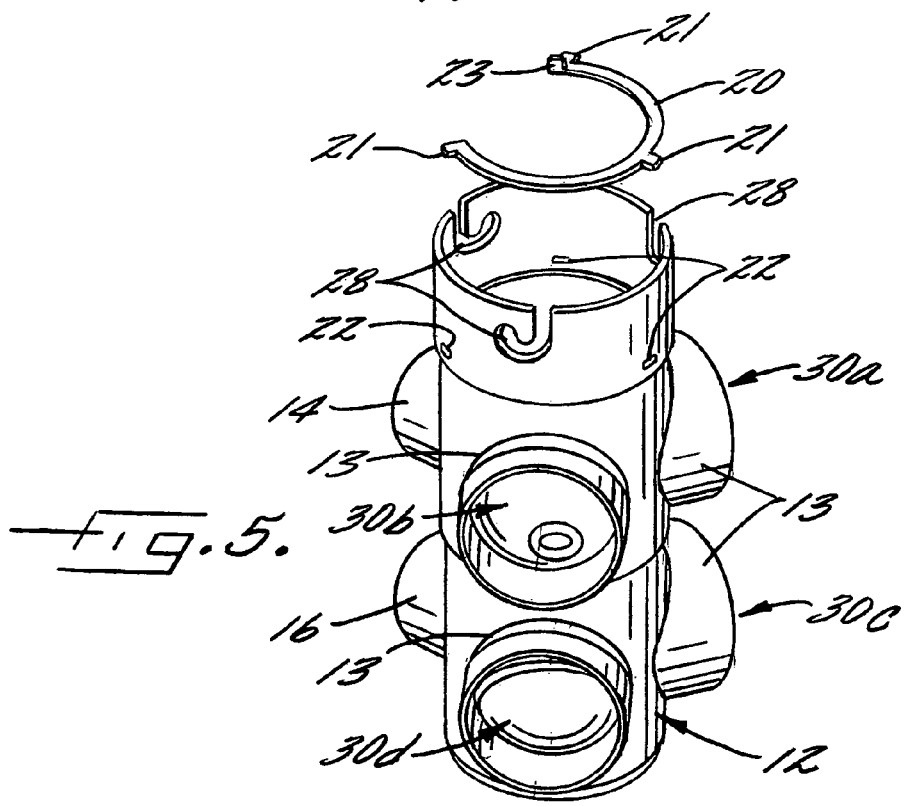
FIG. 5 is a perspective view illustrating the housing of the sequencing valve of FIG. 1.

According to one typical assembly of the sequencing valve 10, the drive coupling 67, seals 78, 79, housings 74, 76, and cams 40, 50 are arranged on the shaft 60 in a spatial order as shown in FIGS. 3 and 4. For example, the pins 72 can be inserted into the shaft 60, starting with the pin 72 received through a bore 68 through the drive coupling 67 and the corresponding hole 70*a* in the shaft 60. One of the shaft seals 78, the drive side housing 76, and one of the outside seals 79 are then placed on the shaft 60. The first cam 40 is also received on the shaft 60 and secured thereon by one of the pins 72, which is inserted through the corresponding hole 70*b* in the shaft 60 and received by the slot 44 in the cam 40. The shaft 60 next receives the shaft seal 78, the central housing 74, the outside seal 79, and the second cam 50, and one of the pins 72 is inserted into hole 70*c* and received by the slot 54 of the cam 50. Thus, the cams 40, 50, housings 74, 76, seals 78, 79, and coupling 67 are secured to the shaft 60 without significant gaps between the adjacent components on the shaft 60 so that the shaft 60, with the attached components, can then be inserted into the housing 12 with the bearing housing 64 and secured therein with a locking ring 20. The locking ring 20 can fit partially into a groove defined by an inner surface of the housing 12, or the locking ring 20 can define two or more protrusions 21, shown in FIG. 5, that engage corresponding holes 22 in the housing 12 to minimize the likelihood of the shaft 60 and other internal components inadvertently coming out of the housing 12. The locking ring 20 can be provided with a tang 23 to assist in its removal, for example, during disassembly of the valve 10 for servicing. Finally, a drive shaft 19 of the actuator 18 can be engaged with a drive slot 69 in the coupling 67, the check valves 30*a*, 30*b*, 30*c*, 30*d* can be connected to the housing 12 of the sequencing valve 10, and the ports 14, 16 can be connected to the heat exchanger 100. The actuator 18 can also have protrusions 24 extending from a collar 26 for engaging j-shaped slots 28 in the housing 12.

Figure 6:
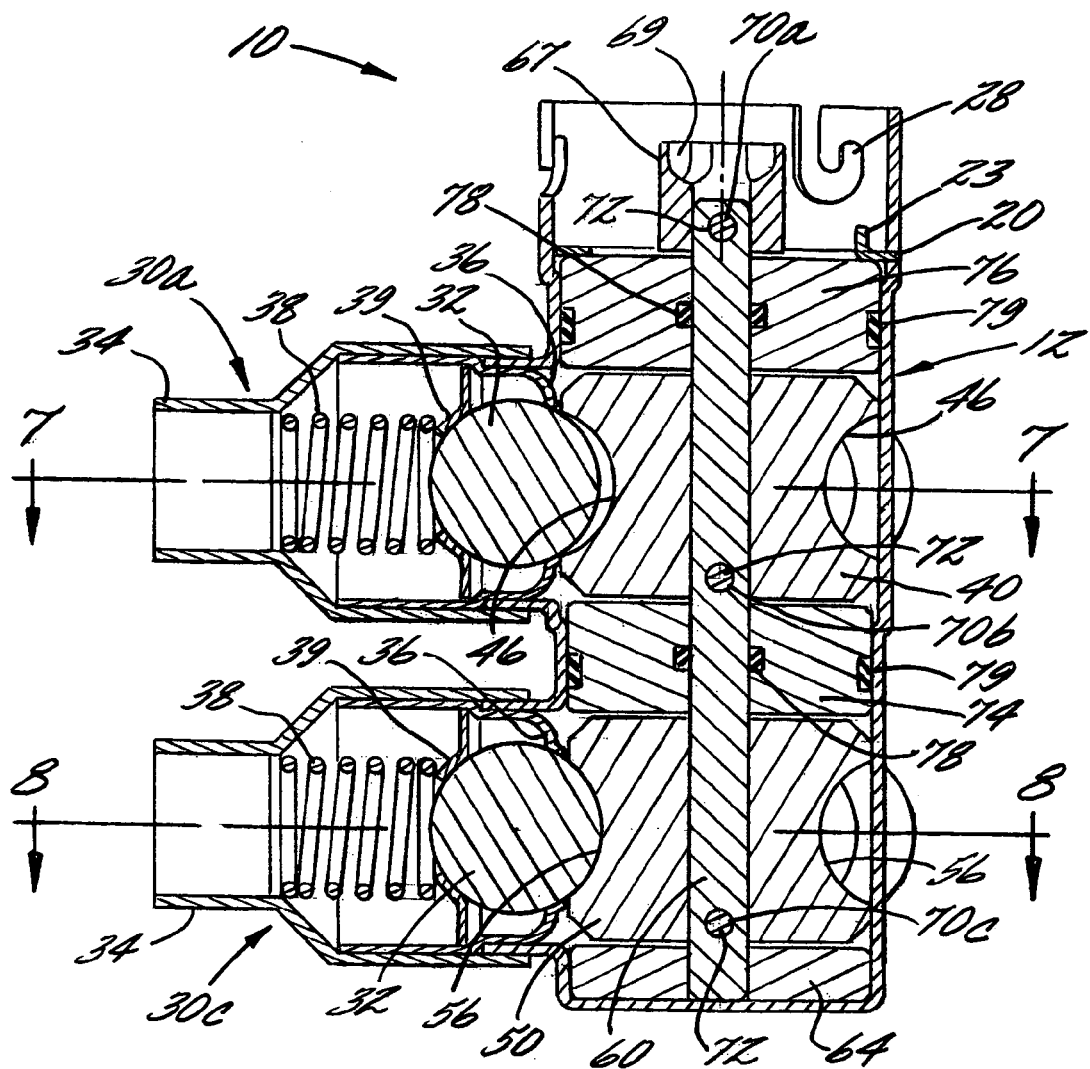
FIG. 6 is a section view in elevation illustrating the sequencing valve of FIG. 1.
Figure 7:
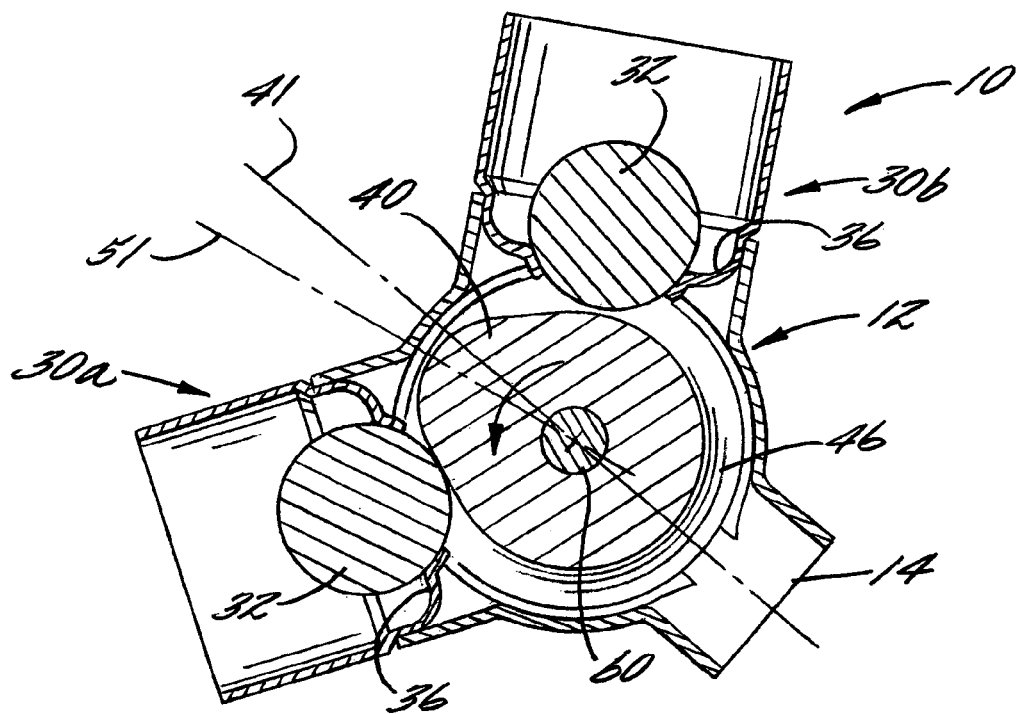
FIG. 7 is a section view illustrating the sequencing valve of FIG. 1 as seen along line 7-7 of FIG. 6.
Figure 8:
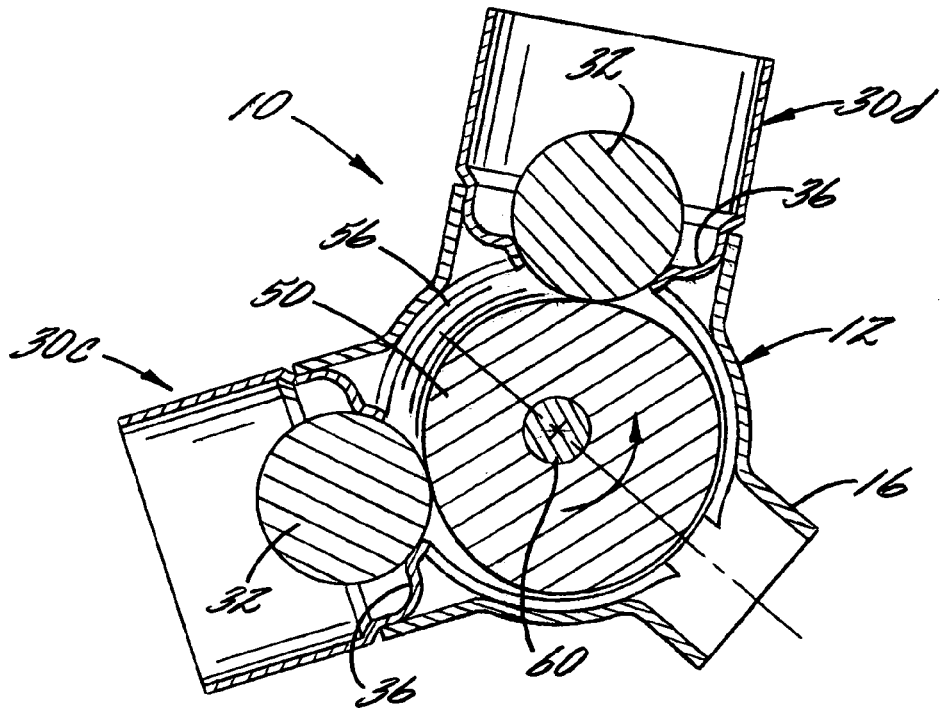
FIG. 8 is a section view illustrating the sequencing valve of FIG. 1 as seen along line 8-8 of FIG. 6.

As shown in FIGS. 6-8, the first cam 40 is positioned proximate to the first and second check valves 30*a*, 30*b* and the first port 14. The second cam 50 is positioned proximate to the third and fourth check valves 30*c*, 30*d* and the second port 16. The central housing 74 and seals 78, 79 are positioned between the first and second ports 14, 16 to prevent fluid from flowing between the first port 14 and the second port 16, the third check valve 30*c*, and the fourth check valve 30*d*. Similarly, the second port 16 is fluidly isolated from the first and second check valves 30*a*, 30*b*. Thus, fluids entering the housing 12 through the first or second check valves 30*a*, 30*b* flow through the first port 14 and into the heat exchanger 100. Fluids exiting the heat exchanger 100 through the first port 14 can flow through either of the first and second check valves 30*a*, 30*b* if the respective valve 30*a*, 30*b* is open. Fluids that enter the housing 12 through the third or fourth check valves 30*c*, 30*d* flow into the heat exchanger 100 through the second port 16. Fluids exiting the heat exchanger 100 through the second port 16 can flow through either of the third and fourth check valves 30*c*, 30*d* if the respective valve 30*c*, 30*d* is open.

The springs 38 urge the balls 32 of the check valves 30*a*, 30*b*, 30*c*, 30*d* against the seats 36 such that a portion of each ball 32 extends into the housing 12 to contact the respective cam 40, 50. Thus, the balls 32 follow the cams 40, 50, i.e., the balls are alternately lifted radially outward by the cams 40, 50 as the cams 40, 50 rotate to sequentially open the check valves 30*a*, 30*b*, 30*c*, 30*d*. The cams 40, 50 have a scallop shape, that is, the cams 40, 50 are generally cylindrical with a groove 46, 56 that extends circumferentially around the respective cam 40, 50 as shown in FIG. 6. By the term "circumferential," it is meant that each groove 46, 56 extends around the rotational axis of the respective cam 40, 50 in an arcuate path at a periphery of the cam 40, 50. The grooves 46, 56 define eccentric cam surfaces of the cams 40, 50 that can be circular or non-circular. For example, each groove 46, 56 can define a circular path that is non-concentric with the rotational axis of the respective cam 40, 50, or each groove 46, 56 can be non-circular as shown in FIGS. 7 and 8. Thus, each groove 46, 56 can vary in depth throughout the cam 40, 50, the depth being measured in a direction perpendicular to the rotational axis of the cam 40, 50. Alternatively, in other embodiments, each groove 46, 56 can be uniform in depth throughout the cam 40, 50.

Each groove 46, 56 partially receives the ball 32 of the respective check valve 30, 30*b*, 30*c*, 30*d*, increasing the area of contact between the cams 40, 50 and the balls 32 as compared to a conventional cam that generally contacts a spherical element at a single point of contact. The increased area of contact between the cams 40, 50 and balls 32 reduces the contact, or Hertzian, stresses that result in the balls 32 and cams 40, 50. The grooves 46, 56 also maintain a relative position of the balls 32 and cams 40, 50 by aligning the balls 32 and cams 40, 50 in a direction parallel to the rotational axis of the cams 40, 50. In addition, the grooves 46, 56 allow the balls 32 to seat against the valve seats 36 while reducing the likelihood of fluid flow-induced oscillation of the balls 32, which can result in noise and wear to the balls 32, the seats 36, and/or the cams 40, 50. Further, the scallop shapes of the cams 40, 50 help keep the cams 40, 50 and the balls 32 clean during operation. For example, the radius of curvature as shown in cross-section of each groove 46, 56 (FIG. 6) can be slightly less than the radius of curvature of the respective ball 32 so that the ball 32 is gripped in the groove 46, 56 as the cam 40, 50 rotates, causing the ball 32 to turn and scrape or rub against the respective valve seat 36 to remove debris from the balls 32 and/or the valve seat 36. The cross-sectional radius of the scallop shaped grooves 46, 56 can vary throughout the length of the grooves 46, 56, for example, so that each ball 32 is not gripped when the respective check valve 30a, 30b, 30c, 30d is open, allowing the ball 32 to rotate freely as the fluid flows through the check valve 30a, 30b, 30c, 30d and allowing any debris to be flushed away from the ball 32.

The eccentric or lobed shapes of the cams 40, 50 as defined by the grooves 46, 56 are illustrated in FIGS. 7 and 8, in which the cams 40, 50 are shown in a closed or off position. In the off position, each cam 40, 50 does not urge the balls 32 of the check valves 30a, 30b, 30c, 30d outward, and the balls 32 are instead held against the valve seats 36 by the springs 38 so that fluid cannot pass through the check valves 30a, 30b, 30c, 30d. The actuator 18 can be configured to rotate the cams 40, 50 in either or both directions. For example, if the sequencing valve 10 is adjusted to its first operable position by rotating the cams 40, 50 counterclockwise as indicated in FIGS. 7 and 8, the first and second cams 40, 50 open the first and fourth check valves 30a, 30d, respectively. In the first operable position, the first fluid source 80 is fluidly connected to the first port 14 through the first check valve 30a and the first exhaust 82 is fluidly connected to the second port 16 through the fourth check valve 30d. Thus, hot water flows from the first fluid source 80 through the heat exchanger 100. As the sequencing valve 10 is adjusted to its second operable position, the cams 40, 50 rotate clockwise so that the first and fourth check valves 30a, 30d are closed and the cams 40, 50 open the second and third check valves 30b, 30c. Thus, the fluid flow from the first fluid source 80 stops, and a flow of the second fluid is commenced, the cold water flowing from the second fluid source 90, through the third check valve 30c and the second port 16, then through the heat exchanger 100 and returning through the first port 14 to the second check valve 30b, where the fluid is discharged to the second exhaust 92. Alternatively, the actuator 18 can be configured to rotate the shaft 60 and, hence, the cams 40, 50 in a single direction to adjust the cams 40, 50 between the first and second positions.

With regard to the timing of the cams 40, 50, it is noted that the cams 40, 50 can define different shapes and can be staged or clocked, i.e., adjusted to different rotational, or angular, positions on the shaft 60 so that each cam 40, 50 opens and closes the respective check valves 30a, 30b, 30c, 30d at different rotational positions of the shaft 60. For example, the first cam 40 can be mounted on the shaft 60 such that a primary axis 41 of the first cam 40 is advanced in the direction of rotation relative to a primary axis 51 of the second cam 50, as illustrated in FIG. 7. When the cams 40, 50 are rotated from the off position to the first operable position, the first and fourth check valves 30a, 30d are not opened at exactly the same times, but the first check valve 30a instead opens slightly before the fourth valve 30d. Thus, fluid pressure from the first fluid source 80 is transmitted through the first check valve 30a, the first port 14, the heat exchanger 100, and the second port 16, to the fourth check valve 30d, to exert pressure on the ball 32 of the fourth check valve 30d. This pressure on the fourth check valve 30d is typically insufficient for opening the fourth check valve 30d, but the pressure does partially counter the spring force exerted on the ball 32 of the fourth check valve 30d and reduces the force required by the second cam 50 for opening the fourth check valve 30d, thereby reducing the torsional load required of the actuator 18 for opening the fourth check valve 30d. Additionally, as shown in FIG. 8, the second cam 50 can define a wider lobe portion relative to the first cam 40 so that the third and fourth valves 30c, 30d are kept open during a greater rotational interval of the shaft 60, and so that the third check valve 30c is opened slightly before the second check valve 30b to reduce the torque required to open the second check valve 30b. Additionally, the second cam 50, which in this case controls the flow of the fluids from the second fluid source 90 and to the first exhaust 82, is configured to open the third check valve 30c as the fourth check valve 30d is being closed so that the spring force of the spring 38 in the third check valve 30c is partially overcome by the spring force of the spring 38 in the fourth check valve 30d, thereby reducing the torsional load required of the actuator 18 for opening the third check valve 30c.

Figure 9:
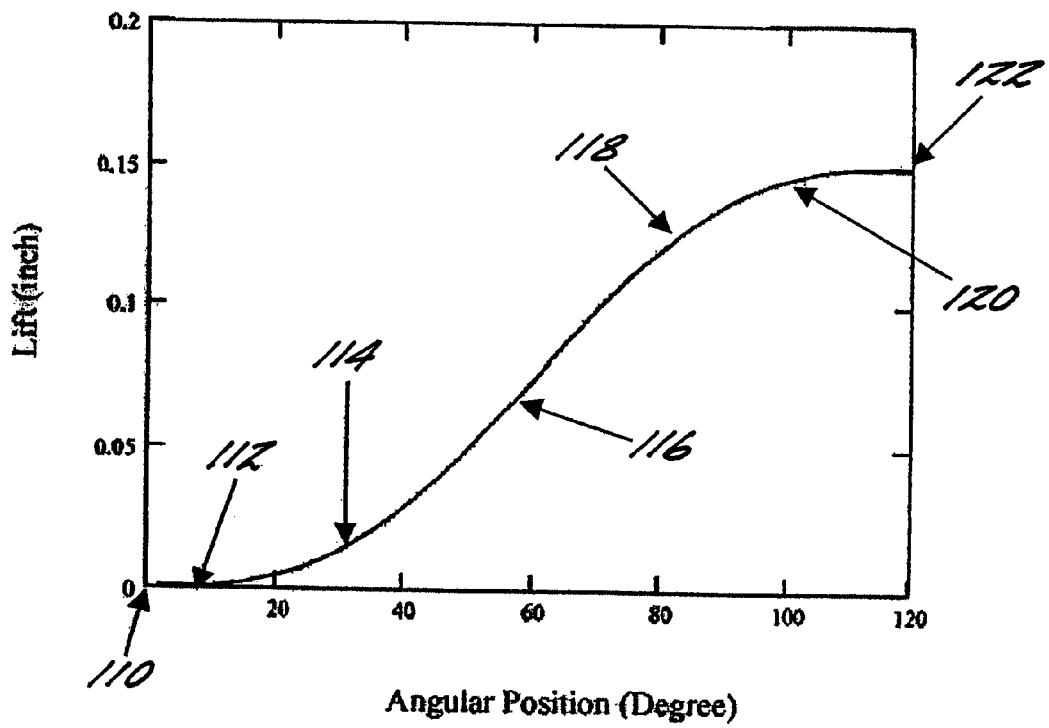
FIG. 9 is a graph illustrating a position of one of the balls of the check valves of the sequencing valve of FIG. 1, the position shown as a function of a rotational position of the cam and shaft.
Figure 10:
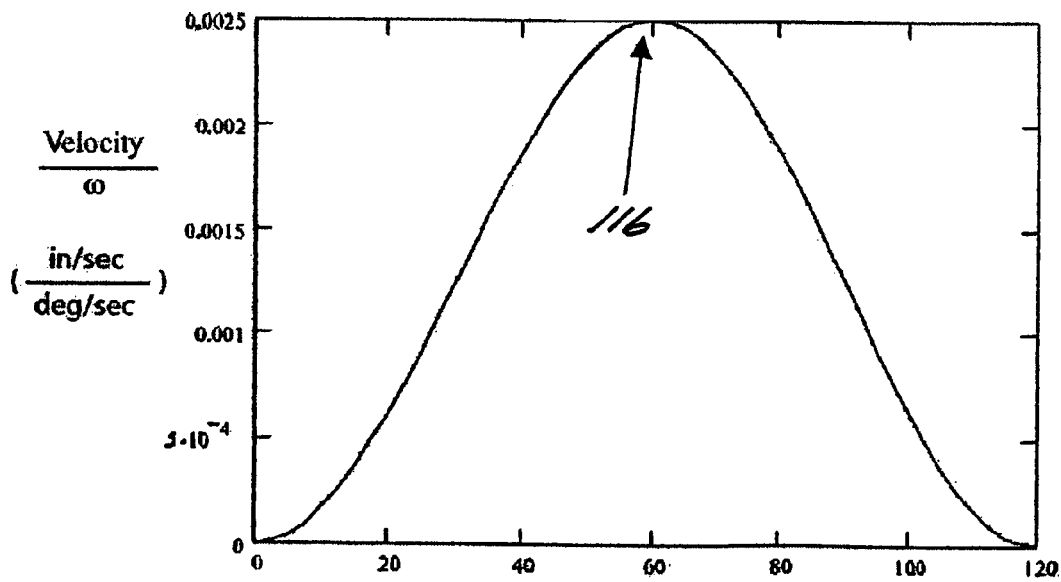
FIG. 10 is a graph illustrating a velocity of the ball of FIG. 9, the velocity shown per angular velocity and relative to the rotational position of the cam and shaft.
Figure 11:
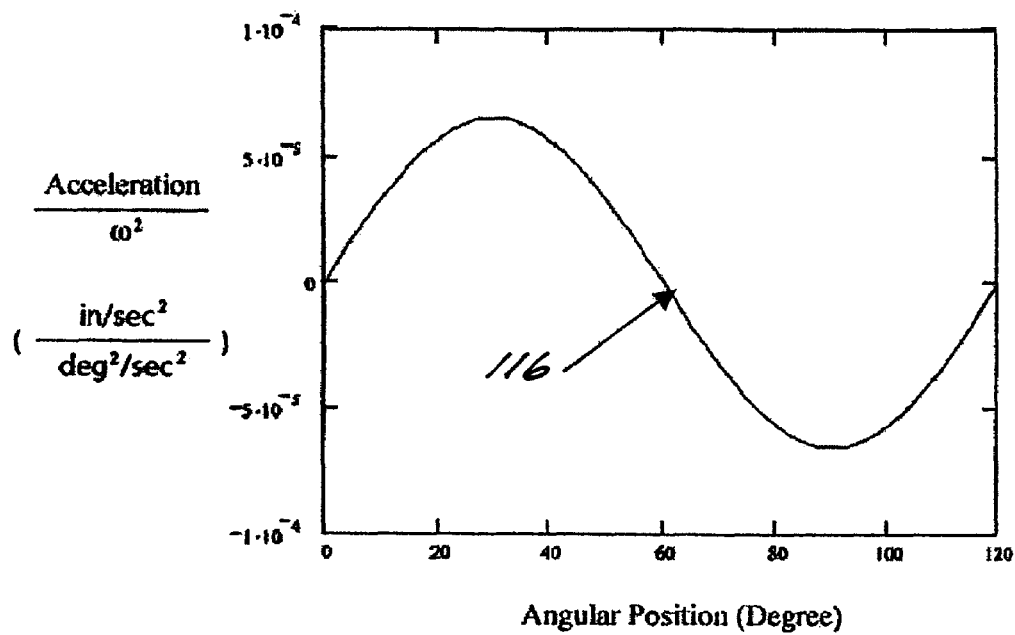
FIG. 11 is a graph illustrating an acceleration of the ball of FIG. 9, the acceleration shown per angular velocity squared and relative to the rotational position of the cam and shaft.

The eccentric shape or profile of the cams 40, 50 or the grooves 46, 56 in the cams 40, 50 can be shaped to minimize the torque required to rotate the cams 40, 50 and open the valves 30a, 30b, 30c, 30d. Similarly, the profile can be designed to minimize the jerk, or rate of change of acceleration, of each ball 32 that follows the cams 40, 50. The jerk is measured as the acceleration of the ball 32 in a lift direction perpendicular to the rotational axis of the shaft 60 and with respect to a change in the rotational position of the shaft 60. The jerk can alternatively be measured with respect to time. By reducing the jerk of the ball 32, the stress on the ball 32 and the cam 40, 50 that the ball 32 is following can be reduced. According to one embodiment of the present invention, a portion of one or both of the cams 40, 50 can have a profile that is defined by a $3^{rd}$ order cycloidal curve. For example, a portion of the profile of each cam 40, 50, as defined by the groove 46, 56 therein, can becharacterized by the equation:

$$Y(\phi) = h * \left[ \frac{\phi}{\beta} - \frac{1}{2\pi} \sin\left( \frac{360°\phi}{\beta} \right) \right]$$

where φ is the rotational or angular position of the shaft 60 or cam 40, 50 measured in degrees, Y(φ) is the lift of one or each of the balls 32 from the respective valve seat 36 in the radially outward direction, h is the maximum lift of the respective ball 32 from the respective valve seat 36 in the radially outward direction, and β is the rotational position of the shaft 60 at which the lift Y(φ) is equal to the maximum lift h. The lift Y(φ) of the balls 32 is measured in units of length, for example, inches as shown in FIG. 9. The rotational portion of the cam 40, 50 defined by the equation can span between 0 and 360 degrees, for example, a segment spanning at least about 45 degrees. Although a $3^{rd}$ order curve is described above, the profile can alternatively be defined by curves of higher order such as a $4^{th}$ order parabolic curve.

Figure 12:
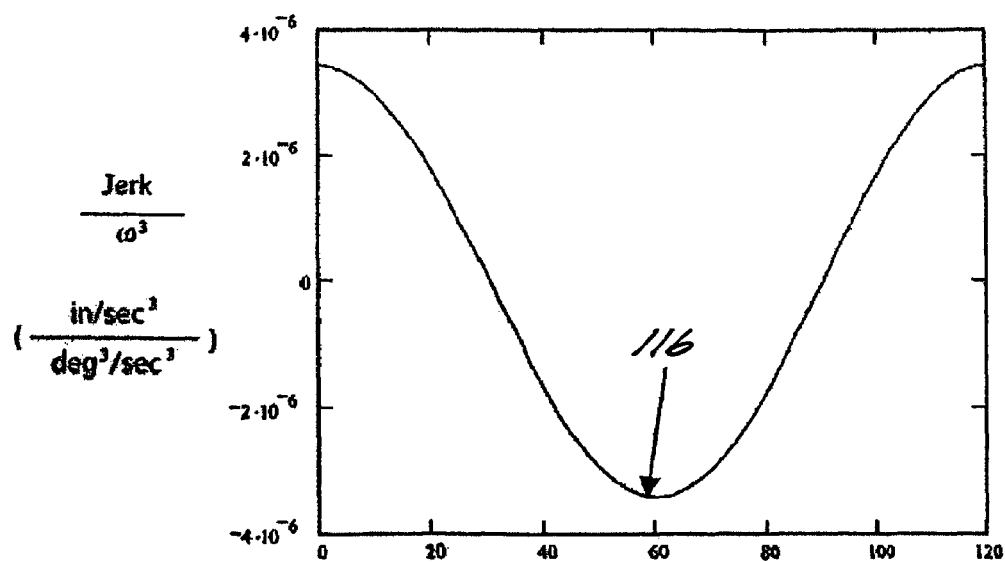
FIG. 12 is a graph illustrating a jerk of the ball of FIG. 9, the jerk shown per angular velocity cubed and relative to the rotational position of the cam and shaft.

FIGS. 9-12 illustrate pictorially the motion of the ball 32 of the fourth check valve 30d that is actuated by the second cam 50, the cam 50 having a profile defined by the equation above and wherein co is the angular, or rotational, velocity of the cam 50 measured in degrees/second. FIGS. 9-12 illustrate the position, velocity, acceleration, and jerk of the ball 32 relative to the rotational position of the cam 50. As shown in FIG. 9, the cam 50 and the ball 32 begin at an off position, indicated by reference numeral 110, in which the shaft 60 is at a rotational position of zero degrees and the ball 32 is lifted by zero inches so that the cam 50 just touches the ball 32 and the ball 32 rests against the valve seat 36 so that the check valve 30d is closed. The cam 50 rotates to a subsequent position 112 without lifting the ball 32 by any appreciable amount. As the cam 50 rotates further toward a subsequent position 114, the cam 50 begins to lift the ball 32 slowly, maintaining a substantially small jerk (FIG. 12). The cam 50 continues to rotate, lifting the ball 32 at a rate that is non-linear relative to the rotational rate of the cam 50. At about position 116, the acceleration of ball 32 switches from positive to negative (FIG. 11), and the velocity begins to decrease (FIG. 10), becoming noticeably decreased at about position 118. The ball 32 approaches its maximum lift position at about position 120, and thereafter maintains a substantially constant lift until about position 122, at which point the shaft 60 and the cam 50 are in the second operable position and the check valve 30d is fully open. As illustrated in FIG. 12, the jerk is continuous throughout the motion of the cam 50, i.e., with no abrupt changes, and varies less than about $5.8 \times 10^{-6}$ $(in/sec^3)/(deg^3/sec^3)$ in the embodiment illustrated in FIGS. 9-12.

Many modifications and other embodiments of the inventions set forth herein will come to mind to one skilled in the art to which these inventions pertain having the benefit of the teachings presented in the foregoing descriptions and the associated drawings. Thus, the invention is not limited to any particular orifice orientation. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A hydronic system for selectively exchanging thermal energy between a thermal medium and fluids, the system comprising:
   a heat exchanger having first and second ports, at least one of the ports being configured to receive first and second fluids and at least one of the ports being configured to discharge the fluids;
   first and second fluid sources configured to supply the first and second fluids to the heat exchanger;
   first and second fluid exhausts configured to receive the fluid from the heat exchanger; and
   a sequencing valve adjustable between first and second operable positions, the valve being configured in the first operable position to fluidly connect the first fluid source and the first fluid exhaust to the heat exchanger, and the valve being configured in the second operable position to fluidly connect the second fluid source and the second fluid exhaust to the heat exchanger.

2. A hydronic system according to claim 1 wherein the first fluid source is configured to supply a fluid at a first temperature and the second fluid source is configured to supply a fluid at a second temperature, the first temperature being higher than a temperature of the thermal medium and the second temperature being lower than the temperature of the thermal medium such that the first and second fluid sources selectively heat and cool the thermal medium.

3. A hydronic system according to claim 1 further comprising an actuator operably connected to the sequencing valve and configured to adjust the valve between the first and second operable positions.

4. A hydronic system according to claim 1 wherein the sequencing valve is configured to be adjusted to an off position characterized by the first and second fluid sources being substantially fluidly disconnected from the heat exchanger.

5. A hydronic system according to claim 1 wherein the sequencing valve is configured to fluidly connect the first fluid source to the first port and fluidly connect the second fluid source to the second port such that the sequencing valve in the first operable position provides a flow of the first fluid in a first direction through the heat exchanger from the first port to the second port and the sequencing valve in the second operable position provides a flow of the second fluid in a second direction from the second port to the first port.

6. A hydronic system according to claim 1 wherein the sequencing valve comprises:
   a housing fluidly connected to the first and second ports of the heat exchanger;
   a shaft rotatably mounted in the housing, adjustable between first and second rotational positions;
   first and second check valves in fluid communication with the first port, the first check valve being adjustable to control a flow of the first fluid through the first port and the second check valve being adjustable to control a flow of the second fluid through the first port;
   third and fourth check valves in fluid communication with the second port, the third check valve being adjustable to control a flow of the first fluid through the second port and the fourth check valve being adjustable to control a flow of the second fluid through the second port; and
   first and second cams mounted on the shaft such that each of the cams is rotatably adjustable with the shaft between the first and second operable positions of the shaft, the first cam configured to adjust the first and second check valves and the second cam configured to adjust the third and fourth check valves.

7. A hydronic system according to claim 6 wherein each of the check valves is a ball check valve having a ball configured to be contacted and thereby operably adjusted by a respective one of the cams.

8. A hydronic system according to claim 7 wherein at least one of the cams defines a groove extending generally circumferentially on the cam, the groove configured to at least partially receive at least one of the balls of the check valves.

9. A hydronic system according to claim 8 wherein at least a portion of the groove has a cross-sectional shape that defines an arc having a radius less than that of an outer curvature of a respective one of the balls such that the cam engages and grips the respective ball.

10. A hydronic system according to claim 6 wherein each cam is generally cylindrical and defines a groove of varying depth such that the groove extends in an eccentric arc to define a cam profile.

11. A hydronic system according to claim 6 wherein the first and second cams are staged to engage respective check valves at different rotational positions of the shaft.

* * * * *